E. R. & G. W. DUNLAP.
Carpenter's Gage Tool.
No. 207,494. Patented Aug. 27, 1878.
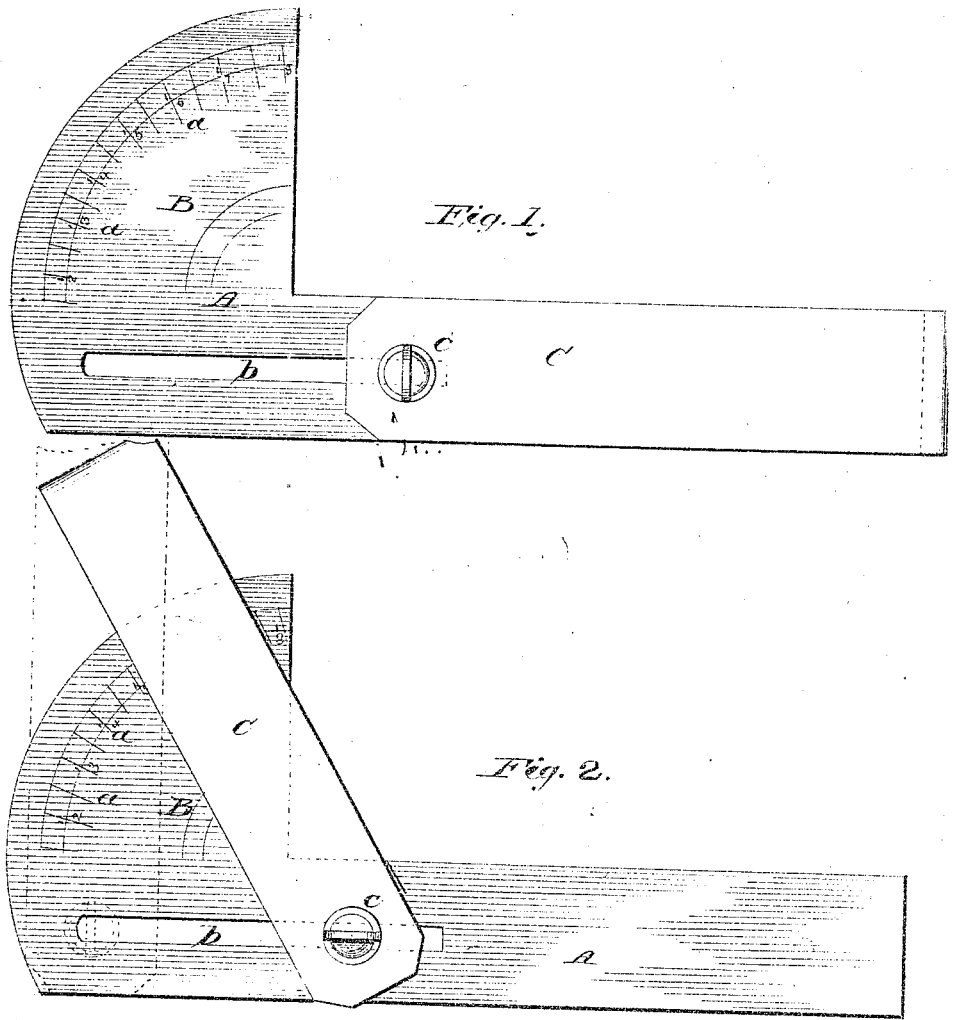

UNITED STATES PATENT OFFICE.

EMMET R. DUNLAP, OF SOUTH LYON, AND GEORGE W. DUNLAP, OF GRAND RAPIDS, MICHIGAN.

IMPROVEMENT IN CARPENTERS' GAGE-TOOLS.

Specification forming part of Letters Patent No. 207,494, dated August 27, 1878; application filed July 13, 1878.

*To all whom it may concern:*

Be it known that we, EMMET R. DUNLAP, of South Lyon, Oakland county, Michigan, and GEORGE W. DUNLAP, of Grand Rapids, in the county of Kent and State of Michigan, have invented certain new and useful Improvements in Carpenters' Gage-Tools; and we do hereby declare that the following is a full, clear, and exact description thereof, which will enable others skilled in the art to which it appertains to make and use the same, reference being had to the accompanying drawings, which form a part of this specification.

Figure 1 is a plan view, and Fig. 2 is a similar view showing the rule or bail in a different position.

Similar letters of reference denote corresponding parts in both figures.

This invention relates to an improved implement for the use of carpenters and others, which said implement consists of a gage for laying off the pitch in cutting miters, framing rafters, &c.

Our improved implement consists of a graduated segment or scale secured upon a handle provided with a pivoted adjustable bail or rule, substantially as we shall now proceed more fully to describe.

In the drawing, A is a straight rule or handle, having at one end a slot, *b*, above which is arranged a segment, B, secured to or made of the same piece with the handle. C is a straight rule or bail, pivoted adjustably in the slot *b* by a set-screw, *c*, and so arranged that when the implement is not in use it may be folded down over the end of handle A, as shown in Fig. 1. In this class of tools, where the rule or bail C is to fold over the rule A, the advantage of the slot *b* is, that a shorter bail, C, may be used than in those where the bail C is simply pivoted to form the center of the segment B, and the screw may be loosened and the bail moved away from the segment and folded down and secured, thereby forming a neat and compact tool. Upon the segment B are laid off a series of lines, *a a*, indicating the various degrees of "pitch," or, in other words, the various angles commonly used in miter-cutting, framing rafters, &c. These lines are laid off with reference to the edge of the bail or rule C when adjusted or pivoted at a certain point, which may easily be found by first bringing the edge of the rule in a line with the pitch-line which is wanted, and then securing the rule by means of the set-screw *c*. The angle between the edge of the bail or rule C and that of the handle A is the pitch, which may then easily be indicated by a pencil-line upon the piece of timber. By the slot *b* we are enabled to adjust the bail or rule C near the end of handle A, so as to form a try-square, as shown in dotted lines, Fig. 2, while, at the same time, the bail or rule may be readily slid back far enough to close over the handle, as shown in Fig. 1.

We are aware of the patent to Thompson, October 12, 1858, which is for a miter-gage consisting of a handle having a graded segment and a swinging bail. This we do not claim; but,

Having thus described our invention, we claim and desire to secure by Letters Patent of the United States—

In combination, the bail C, adjustably pivoted within the slot *b* of the rule A, substantially as and for the purpose set forth.

In testimony that we claim the foregoing as our own we have hereto affixed our signatures in presence of two witnesses.

EMMET R. DUNLAP.
GEORGE W. DUNLAP.

Witnesses to the signature of Emmet R. Dunlap:
DWIGHT DUNLAP,
J. J. KESTER.

Witnesses to the signature of George W. Dunlap:
S. S. CHIPMAN,
JOHN M. BUTLER.